US009779286B2

(12) United States Patent
Morishita

(10) Patent No.: US 9,779,286 B2
(45) Date of Patent: Oct. 3, 2017

(54) FEATURE POINT LOCATION ESTIMATION DEVICE, FEATURE POINT LOCATION ESTIMATION METHOD, AND FEATURE POINT LOCATION ESTIMATION PROGRAM

(71) Applicant: NEC Corporation, Minato-ku, Tokyo (JP)

(72) Inventor: Yusuke Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/912,491

(22) PCT Filed: May 26, 2014

(86) PCT No.: PCT/JP2014/002750
§ 371 (c)(1),
(2) Date: Feb. 17, 2016

(87) PCT Pub. No.: WO2015/029287
PCT Pub. Date: Mar. 5, 2015

(65) Prior Publication Data
US 2016/0203357 A1    Jul. 14, 2016

(30) Foreign Application Priority Data

Aug. 28, 2013   (JP) ................................ 2013-176283

(51) Int. Cl.
*G06K 9/00*   (2006.01)
*G06K 9/52*   (2006.01)
(Continued)

(52) U.S. Cl.
CPC ..... *G06K 9/00281* (2013.01); *G06K 9/00248* (2013.01); *G06K 9/00288* (2013.01);
(Continued)

(58) Field of Classification Search
None
See application file for complete search history.

(56) References Cited

U.S. PATENT DOCUMENTS 8,155,399 B2 *  4/2012  Liu .................... G06K 9/00241
                                                      382/118
2012/0002867 A1   1/2012  Ishiyama et al.

OTHER PUBLICATIONS

Morishita, Y.-"Facial Feature Detection using Generalized LVQ and Facial Shape Model"—MVA2011, Jun. 13-15, 2011, pp. 410-413.*

(Continued)

*Primary Examiner* — Bernard Krasnic

(57) ABSTRACT

Provided is a feature point location estimation device, whereby fitting of a model is less prone to local solutions, and it is possible to detect a facial feature point with more practical precision. The feature point location estimation device comprises: an image input unit which receives input of a facial image from an external source; a nearest neighbor template computation unit which obtains a nearest neighbor template from among positive examples and a nearest neighbor template from among negative examples, the nearest neighbor templates being the templates nearest to an image that is computed from the inputted facial image using a facial feature point location search parameter from among a plurality of facial image templates constituted by the positive examples and the negative examples; a parameter gradient direction computation unit which computes, from the facial feature point location search parameter and the nearest neighbor templates, a gradient direction of the facial feature point location search parameter; and a search parameter update unit which updates the facial feature point location search parameter by adding the computed gradient direction.

9 Claims, 4 Drawing Sheets

(51) Int. Cl.
*G06T 7/60* (2017.01)
*G06T 7/73* (2017.01)
(52) U.S. Cl.
CPC .................. *G06K 9/52* (2013.01); *G06T 7/60* (2013.01); *G06T 7/74* (2017.01); *G06T 2207/30201* (2013.01)

(56) References Cited

OTHER PUBLICATIONS

Xiaoming Liu, "Discriminative Face Alignment," IEEE Transaction on Pattern Analysis and Machine Intelligence (PAMI), vol. 31, No. 11, pp. 1941-1954, Nov. 2011.
D. Cristinacce and T. F. Cootes, "A Comparison of Shape Constrained Facial Feature Detectors," In 6th International Conference on Automatic Face and Gesture Recognition 2004, Korea, pp. 357-380, 2004.
Atsushi Sato et al., "Generalized Learning Vector Quantization," Advances in Neural Information Processing Systems 8, pp. 423-429, 1996.
Yusuke Morishita et al., "Facial Feature Detection using Generalized LVQ and Facial Shape Model", FIT2010 Forum on Information Technology 2010, The Institute of Electronics, Information and Communication Engineers and Information Processing Society of Japan, pp. 213 to 214, Aug. 2010.
Pan Hui et al. "False Positive Reduction for Face Detection using Confidence Score and Geometry of Facial Feature Joints" SSII2012, The 18th Symposium on Sensing via Image Information [CD-ROM], pp. IS1-19-1 to IS1-19-6. Jun. 2012.
International Search Report for PCT Application No. PCT/JP2014/002750, mailed on Aug. 19, 2014.

\* cited by examiner

FEATURE POINT LOCATION ESTIMATION DEVICE, FEATURE POINT LOCATION ESTIMATION METHOD, AND FEATURE POINT LOCATION ESTIMATION PROGRAM

This application is a National Stage Entry of PCT/JP2014/002750 filed on May 26, 2014 which claims priority from Japanese Patent Application 2013-176283 filed on Aug. 28, 2013, the contents of all of which are incorporated herein by reference, in their entirety.

TECHNICAL FIELD

The present invention relates to a feature point location estimation device for detecting the location of a feature point of an eye, a nose, or the like from an image of a face or the like, a feature point location estimation method, and a feature point location estimation program.

BACKGROUND ART

Feature point location detection is a technique for detecting the location of a feature point of an organ such as an eye, a nose or a mouth from an image of a face or the like. The feature point location detection is an important technique for performing face authentication, facial expression recognition, or the like with high accuracy.

As a technique for detecting a feature point location of the face, there is known Active Appearance Model (AAM), for example (NPL 1). With AAM, a model for texture and shape of a face is constructed in a statistical method on the basis of a plurality of facial images and information on feature point locations previously input into the facial images. With AAM, the constructed model is fit to an image including the face to be detected.

That is, with AAM, a parameter of the model is repeatedly updated such that the facial image to be detected is closer to the facial image computed from the model, thereby detecting a feature point location. AAM has been variously extended since it was proposed. For example, there are many proposed methods for combining a plurality of models for detecting a profile or improvements for higher speed or higher accuracy.

AAM is known as being highly accurate when it is used for learning and detecting the faces of a few persons, such as learning the face of one person and constructing a specialized model of the person. To the contrary, AAM is known as being remarkably deteriorated in its performance when it is used for learning and detecting the faces of many persons under non-control (such as various illuminations and postures).

NPL 1 proposes, unlike an AAM model, a method for detecting a facial feature point by constructing a two-class discriminator for discriminating facial images into two classes of facial images acquired when all the facial feature points such as eyes, a nose, and a mouth are at the correct locations (which will be referred to as correct shape below) and facial images acquired when one or more of the facial feature points are out of the correct locations (which will be referred to as deviated shape below), and repeatedly updating a parameter of the model in order to enhance a discrimination score of the two-class discriminator.

PRIOR ART DOCUMENTS

Non Patent Literature

NPL 1: Xiaoming Liu, "Discriminative Face Alignment," IEEE Transaction on Pattern Analysis and Machine Intelligence (PAMI), Vol. 31, No. 11, pp. 1941-1954, 2009

NPL 2: D. Cristinacce and T. F. Cootes, "A Comparison of Shape Constrained Facial Feature Detectors," In 6th International Conference on Automatic Face and Gesture Recognition 2004, Korea, pages 357-380, 2004

NPL 3: SATO A., "Generalized Learning Vector Quantization," Advances in Neural Information Processing Systems 8, 423-429, 1996

SUMMARY OF INVENTION

Technical Problem

With the method described in NPL 1, Haar-like is used as the amount of feature, and Gentle Boost, as one type of Boosting, is used as a discriminator. However, Boosting is a scheme for selecting the amount of feature in a 1D manner, and thus when the method described in NPL 1 is used, a facial feature point to be detected tends to be in a local solution. That is, when the method described in NPL 1 is used, there is a problem that a facial feature point is difficult to acquire with high accuracy.

It is therefore an object of the present invention to provide a feature point location estimation device, whereby fitting of a model is less prone to local solutions, and it is possible to detect a facial feature point with more practical precision, a feature point location estimation method, and a feature point location estimation program.

A feature point location estimation device according to the present invention includes: an image input unit which receives input of a facial image from an external source; a nearest neighbor template computation unit which obtains a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples; a parameter gradient direction computation unit which computes, from the facial feature point location search parameter and the nearest neighbor templates, a gradient direction of the facial feature point location search parameter; a search parameter update unit which updates the facial feature point location search parameter by adding a computed gradient direction; a convergence determination unit which determines whether the updated facial feature point location search parameter is convergent; and a search result output unit which, when the facial feature point location search parameter is determined as being convergent, outputs a facial feature point location computed by the facial feature point location search parameter as a search result.

A feature point location estimation method according to the present invention includes the steps of: receiving input of a facial image from an external source; deriving a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples; computing, from the facial feature point location search parameter and the nearest neighbor templates, a gradient direction of the facial feature point location search parameter; updating the facial feature point location search parameter by adding the computed gradient direction; determining whether the updated facial feature point location search parameter is convergent; and when the facial feature point location search parameter is determined as being convergent, outputting a facial feature point location computed by the facial feature point location search parameter as a search result.

A feature point location estimation program according to the present invention causes a computer to perform: an input processing of receiving input of a facial image from an external source; a derivation processing of deriving a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples; a computation processing of computing, from the facial feature point location search parameter and the nearest neighbor templates, a gradient direction of the facial feature point location search parameter; an update processing of updating the facial feature point location search parameter by adding the computed gradient direction; a determination processing of determining whether the updated facial feature point location search parameter is convergent; and an output processing of, when the facial feature point location search parameter is determined as being convergent, outputting a facial feature point location computed by the facial feature point location search parameter as a search result.

Advantageous Effects of Invention

The present invention can enable fitting of a model to be less prone to local solutions and detect a facial feature point with more practical precision.

DESCRIPTION OF EXEMPLARY EMBODIMENTS

Figure 1:
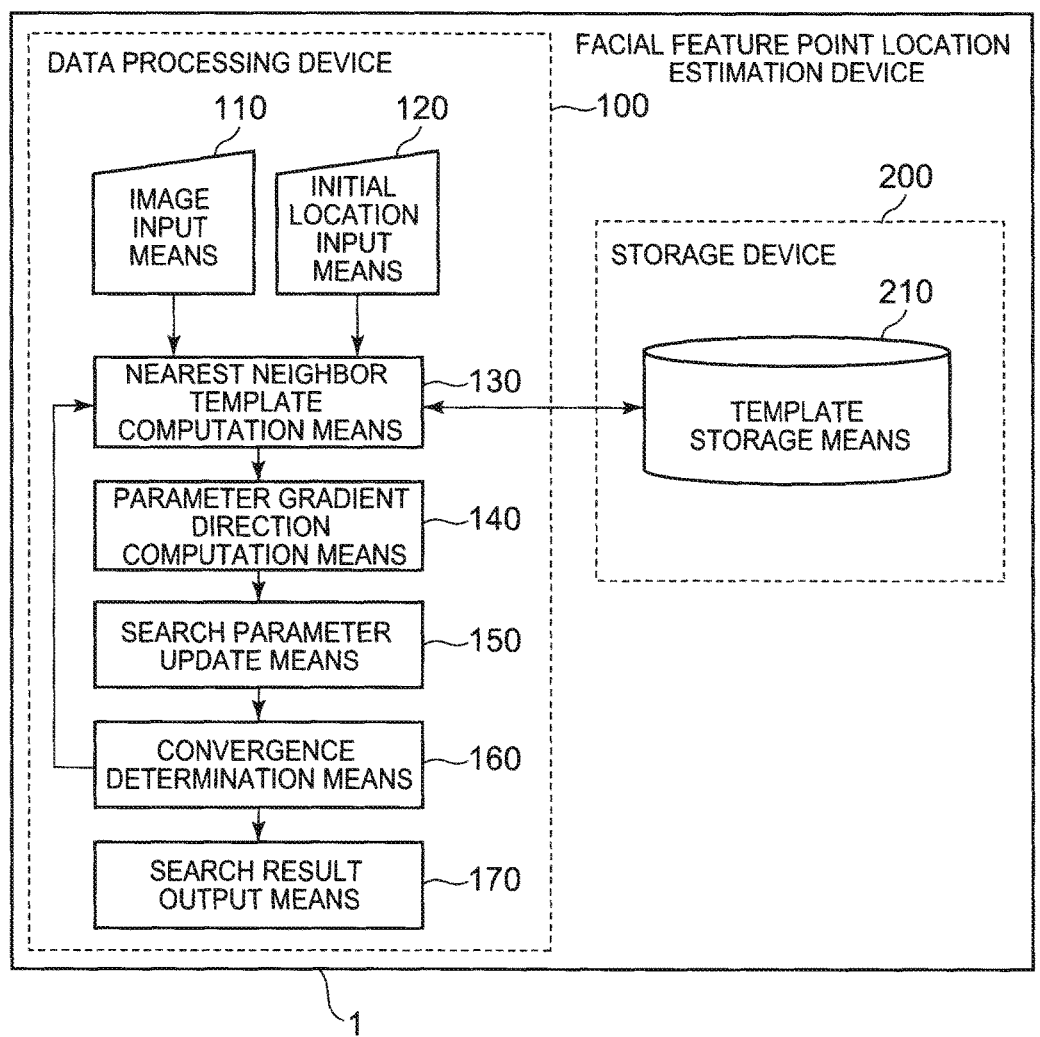
FIG. 1 It depicts a block diagram illustrating an exemplary structure of a facial feature point location estimation device 1.

An exemplary embodiment of the present invention will be described below with reference to the drawings. FIG. 1 is a block diagram illustrating an exemplary structure of a facial feature point location estimation device 1. The facial feature point location estimation device 1 illustrated in FIG. 1 includes a data processing device 100 and a storage device 200.

The data processing device 100 has an image input means 110, an initial location input means 120, a nearest neighbor template computation means 130, a parameter gradient direction computation means 140, a search parameter update means 150, a convergence determination means 160, and a search result output means 170. The storage device 200 has a template storage means 210.

The image input means 110 has a function of receiving input of a facial image from an external source.

The initial location input means 120 has a function of receiving input of facial feature point information used as an initial location of a facial feature point to be searched from an external source.

The facial feature point information indicates the locations of a plurality of facial feature points such as eyes, a nose and a mouth output by an external facial feature point detection device. An externally-input initial location employs the location of a facial feature point acquired by a well-known facial feature point detection device or the facial feature point detection technique described in NPL 2, for example. The initial location may employ the location of a manually-input facial feature point.

The nearest neighbor template computation means 130 has a function of obtaining a nearest neighbor template which is the nearest to an image computed on the basis of a current facial feature point location search parameter (which will be referred to as Warp image below) from among a plurality of templates stored in the template storage means 210.

For the templates, specifically, at least one of representative positive example templates of facial images acquired in a correct shape and at least one of representative negative example templates of facial images acquired in a deviated shape are stored in the template storage means 210.

That is, the nearest neighbor template computation means 130 computes the distances from a positive example template and a negative example template to the Warp image, respectively. The nearest neighbor template computation means 130 then selects one nearest template to the Warp image from among the positive example templates, and one nearest template to the Warp image from among the negative example templates, respectively.

A facial feature point location search parameter (which will be referred to as search parameter or simply parameter below) is configured of a plurality of numerical values indicating the features of facial feature point locations. The search parameter will be denoted as vector p below.

The correct shape is a state in which the facial feature points such as eyes and a nose are all arranged at the locations defined as the feature points, respectively, as described above. The deviated shape is a state in which one or more of all the facial feature points are arranged out of the defined locations, as described above. The deviated shape may be a state in which a processing by a facial feature point detection device fails and some feature points are detected at erroneous locations.

The location of each feature point is defined on the basis of information on facial organs, skeleton structure, or the like. For example, the location of a feature point of the center of an eye of a person is defined as the center of a pupil. The location of a feature point of the lower part of the nose of a person is defined as a tip end of the anterior nasal spine of the skull.

Note that it is difficult to grasp a correct structure of the organs or skeleton of the face and to determine the feature point locations from an image. Therefore, according to the present exemplary embodiment, another standard may be employed as the correct shape. For example, a location on a manually-input image (manually-input feature point) is assumed as a standard of the feature points by such as viewing the image on the basis of the definition of the feature point locations, and thus a state in which all of feature points are arranged on the manually-input feature points may be assumed as "correct shape."

The parameter gradient direction computation means 140 has a function of computing a gradient direction Δp of the search parameter p in an equation for computing a gradient of a search parameter derived by partially differentiating a predetermined evaluation function on the basis of the current search parameter p and the nearest neighbor templates computed and obtained by the nearest neighbor template computation means 130.

The search parameter update means 150 has a function of adding the gradient direction Δp of the search parameter p computed by the parameter gradient direction computation means 140 to the current search parameter p thereby to update the search parameter.

The convergence determination means 160 has a function of determining whether the search parameter p updated by the search parameter update means 150 is convergent. When the search parameter is not convergent, the nearest neighbor template computation means 130 obtains a nearest neighbor template again. When the search parameter is convergent, the convergence determination means 160 outputs the updated search parameter to the search result output means 170.

The search result output means 170 has a function of computing a facial feature point location from the optimized search parameter p. The search result output means 170 outputs the computed facial feature point location as a search result.

In the facial feature point location estimation device 1 according to the present exemplary embodiment, the data processing device 100 is realized by a CPU (Central Processing Unit), for example. The data processing device 100 may be realized in hardware.

The image input means 110, the initial location input means 120, the nearest neighbor template computation means 130, the parameter gradient direction computation means 140, the search parameter update means 150, the convergence determination means 160, and the search result output means 170 are realized by the CPU for performing the processings under control of a program, for example.

In the facial feature point location estimation device 1 according to the present exemplary embodiment, the storage device 200 is realized by a semiconductor memory or a hard disk drive, for example.

The template storage means 210 is realized by a storage area on a semiconductor memory or a hard disk drive, for example.

Figure 2:
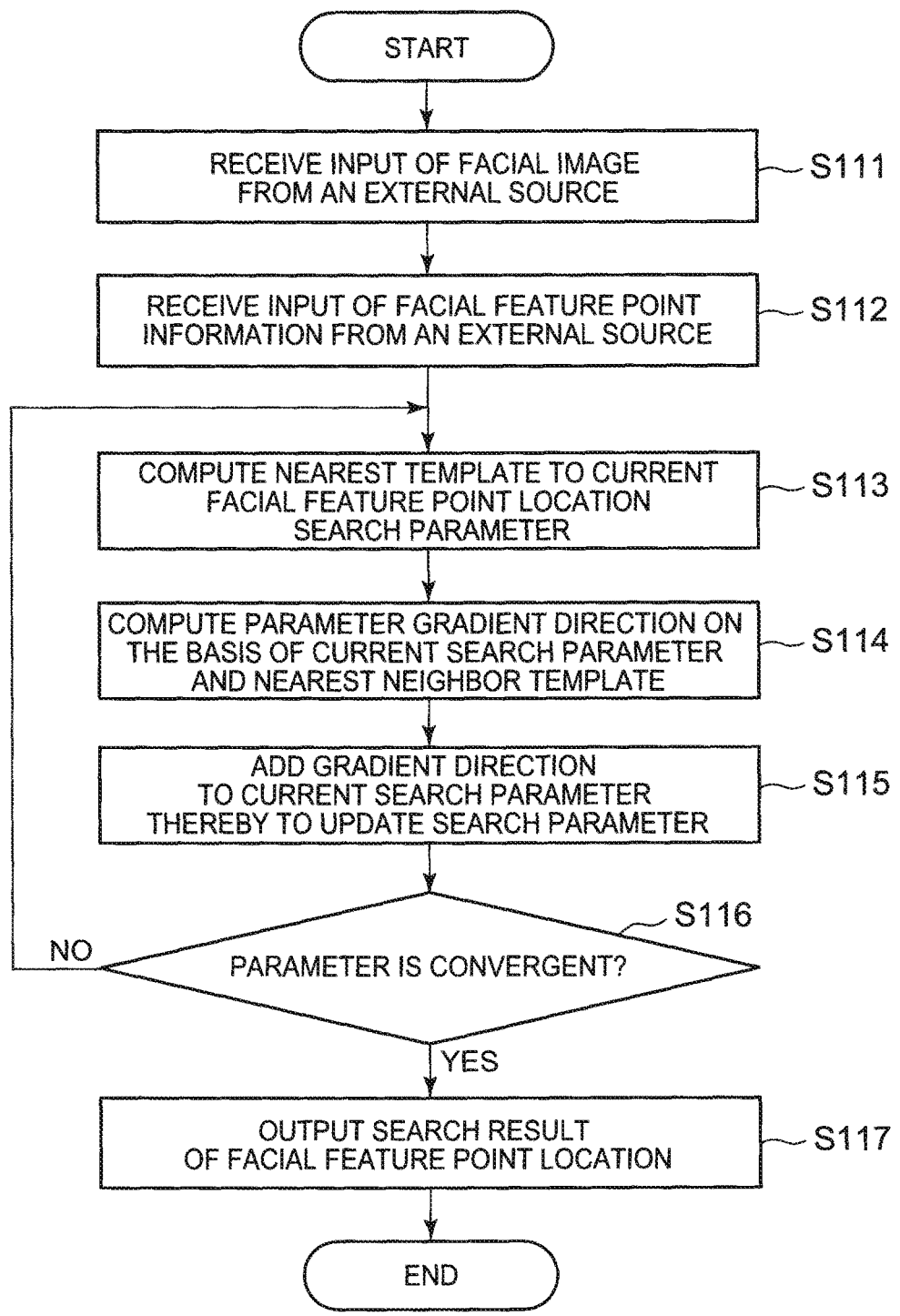
FIG. 2 It depicts a flowchart of the operations of a facial feature point search processing of the facial feature point location estimation device 1.

The operations of a facial feature point search processing according to the present exemplary embodiment will be described below with reference to the flowchart of FIG. 2. FIG. 2 is a flowchart illustrating the operations of the facial feature point search processing of the facial feature point location estimation device 1.

The image input means 110 receives input of a facial image from an external source (step S111).

Then, the initial location input means 120 receives input of facial feature point information used as an initial location of a facial feature point to be searched from an external source (step S112).

Then, the nearest neighbor template computation means 130 obtains a template nearest to an image computed on the basis of a current facial feature point location search parameter p from among a plurality of templates stored in the template storage means 210 (step S113).

Then, the parameter gradient direction computation means 140 computes a gradient direction Δp of the search parameter p in an equation for computing a gradient of a search parameter derived by partially differentiating a predetermined evaluation function on the basis of the current search parameter p and the nearest neighbor template computed and obtained in step S113 (step S114).

Then, the search parameter update means 150 adds the gradient direction Δp of the search parameter p computed in step S114 to the current search parameter p thereby to update the search parameter (step S115).

Then, the convergence determination means 160 determines whether the search parameter p updated in step S115 is convergent (step S116). When the search parameter is not convergent (No in step S116), the facial feature point location estimation device 1 returns to the processing in step S113. When the search parameter is convergent (Yes in step S116), the facial feature point location estimation device 1 proceeds to the processing in step S117.

When the updated search parameter is convergent (Yes in step S116), the search result output means 170 computes a facial feature point location on the basis of the optimized search parameter p. The search result output means 170 then outputs the computed facial feature point location as a search result (step S117).

Figure 3:
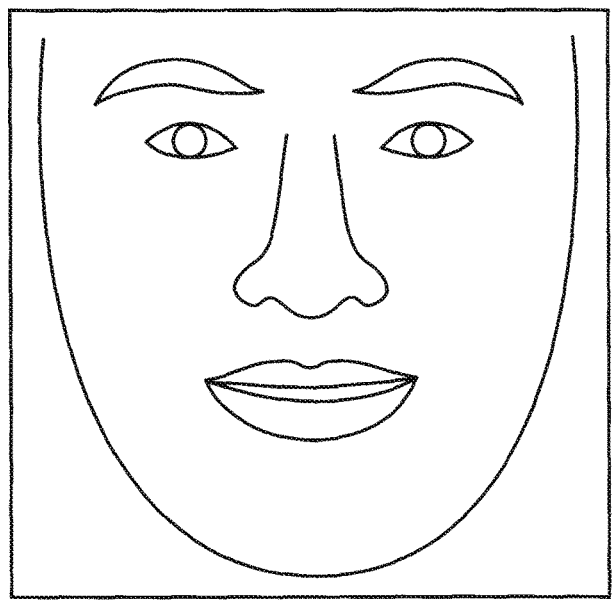
FIG. 3 It depicts an explanatory diagram illustrating an exemplary facial image to be processed by the facial feature point location estimation device 1.

The operations according to the present exemplary embodiment will be described below by use of specific examples. There will be described herein a case in which a facial image illustrated in FIG. 3 is input into the facial feature point location estimation device 1. FIG. 3 is an explanatory diagram illustrating an exemplary facial image to be processed by the facial feature point location estimation device 1.

The image input means 110 receives input of a facial image from an external source (step S111).

Then, the initial location input means 120 receives input of facial feature point information used as an initial location of a facial feature point to be searched from an external source (step S112).

The facial feature point information indicates the location (coordinate) of a facial feature point such as an eye, a nose or a mouth output by a facial feature point detection device, for example. In this case, the facial feature point information indicates the location of a facial feature point on the facial image to be processed by the facial feature point location estimation device 1 in a coordinate as a combination of two numbers of the x coordinate value and the y coordinate value per facial feature point.

The externally-input facial feature point information employs facial feature point information acquired by a well-known facial feature point detection device or the facial feature point detection technique described in NPL 2, for example. The facial feature point information may employ the location of a manually-input facial feature point.

Figure 4:
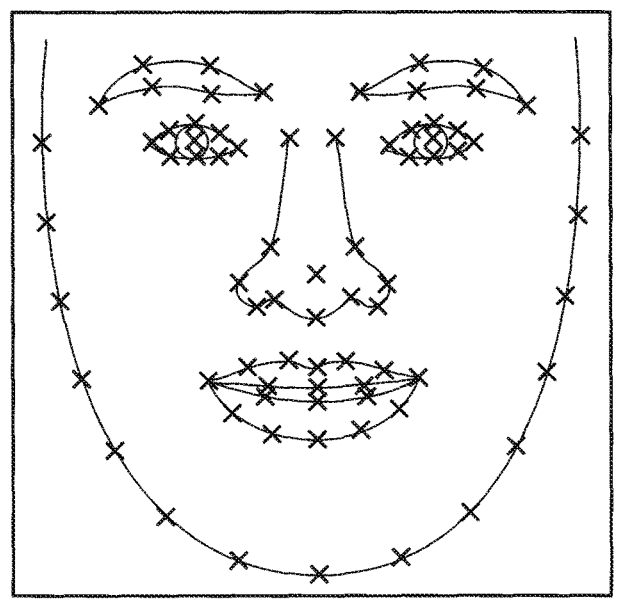
FIG. 4 It depicts an explanatory diagram illustrating exemplary facial feature points to be input by an initial location input means 120 in the facial feature point location estimation device 1.

FIG. 4 is an explanatory diagram illustrating exemplary facial feature points to be input by the initial location input means 120 in the facial feature point location estimation device 1. In the example illustrated in FIG. 4, the locations of the facial feature points to be processed are marked with x. In the present example, as illustrated in FIG. 4, 75 points such as eyes, a nose, and a mouth are marked with x. The facial feature point information input by the initial location input means 120 is the initial locations of the 75 facial feature points illustrated in FIG. 4.

The nearest neighbor template computation means 130 obtains a template nearest to an image computed on the basis of the current facial feature point location search parameter from among a plurality of templates stored in the template storage means 210 (step S113).

A template according to the present exemplary embodiment indicates a facial image. The template storage means 210 stores therein a plurality of positive example templates of representative facial images acquired in a correct shape, and a plurality of negative example templates of representative facial images acquired in a deviated shape.

A positive example template and a negative example template may be desirably defined such that a facial image can be correctly determined as a facial image acquired in a correct shape or a facial image acquired in a deviated shape when making a predetermined computation by use of each template.

A positive example template and a negative example template are appropriately defined when a method such as generalized learning vector quantization (NPL 3) is employed, for example. A method for obtaining an appropriate template (referred to as reference vector in generalized learning vector quantization (GLVQ)) by use of GLVQ prepares a plurality of facial images generated in a correct shape and a plurality of facial images generated in a deviated shape from images shooting therein the faces of a plurality of persons shot in various circumstances. The GLVQ learning processing is performed on the prepared facial images. Consequently, an appropriate template is defined.

A method for estimating a facial feature point location using GLVQ will be described below, but the scope of the present exemplary embodiment is not limited to the contents described below.

The facial feature point location search parameter p according to the present exemplary embodiment is configured as a plurality of numerical values (vectors) indicating the features of facial feature point locations. According to the present exemplary embodiment, the coordinate values of the 75 facial feature points of a plurality of faces shot in various circumstances are subjected to principal component analysis, and the resultant points on the principal component subspace are used as the facial feature point location search parameter p.

The facial feature point location search parameter p needs to be previously initialized prior to the processing by the nearest neighbor template computation means 130. The facial feature point location search parameter p is initialized by use of the locations of the facial feature points input by the initial location input means 120.

The facial feature point location search parameter p is on the principal component subspace of the coordinate values of the 75 facial feature points. Therefore, a value acquired by projecting the locations of the facial feature points input by the initial location input means 120 on the principal component subspace may be an initial value of the facial feature point location search parameter p.

When an appropriate facial feature point location is not input by the initial location input means 120, the values (or all values are zero) acquired by projecting the coordinates of the 75 average facial feature points on the principal component subspace may be an initial value of the facial feature point location search parameters p.

When the above preparation is made, the nearest neighbor template computation means 130 obtains a template nearest to an image computed on the basis of the current facial feature point location search parameter p from among a plurality of templates stored in the template storage means 210.

The nearest neighbor template computation means 130 obtains a template as follows. The facial feature point location search parameter p is on the principal component subspace of the coordinate values of the 75 facial feature points, and thus the nearest neighbor template computation means 130 obtains facial feature point locations corresponding to the current facial feature point location search parameter p by inverse projection from the subspace.

Then, the nearest neighbor template computation means 130 cuts out a facial image from an image input by the image input means 110 by use of the obtained facial feature point locations. The cut-out facial image is a Warp image.

Then, the nearest neighbor template computation means 130 computes the distances between the Warp image and a plurality of templates (facial images) stored in the template storage means 210, and obtains one template nearest to the Warp image from among the positive example templates of representative facial images acquired in a correct shape and one template nearest to the Warp image from among the negative example templates of representative facial images acquired in a deviated shape. The nearest neighbor template computation means 130 assumes the obtained templates as the nearest neighbor templates.

The parameter gradient direction computation means 140 computes a gradient direction of the search parameter p in an equation for computing a gradient of a search parameter derived by partially differentiating a predetermined evaluation function on the basis of the current facial feature point location search parameter p and the nearest neighbor templates computed and obtained by the nearest neighbor template computation means 130 (step S114). A specific procedure of computing a gradient direction will be described below.

A positive example template of a representative facial image acquired in a correct shape and a negative example template of a representative facial image acquired in a deviated shape from among the nearest neighbor templates are assumed as r1 and r2, respectively. At this time, a misclassification measure J in GLVQ relative to a facial image (Warp image) f cut out from the facial feature point locations defined on the basis of the current facial feature point location search parameter p is computed in the following Equation.

[Math. 1]

$$J = (d_1 - d_2)/(d_1 - d_2) \qquad \text{Equation (1)}$$

where

[Math. 2]

$$d_i = ((f - r_i) \cdot (f - r_i))^{1/2} \qquad \text{Equation (2)}$$

The above equation expresses $d_i$.

A gradient direction of the search parameter to be obtained is a direction (gradient) $\Delta p$ in which the misclassification measure J is improved at the current search parameters p. When the misclassification measure J is partially differentiated by the model parameter p, $\Delta p$ is computed in the following Equation.

[Math. 3]

$$\Delta p = \frac{\partial J}{\partial p} = \qquad \text{Equation (3)}$$

-continued $$\frac{\partial}{\partial p}\left(\frac{d_1-d_2}{d_1+d_2}\right) = \frac{\partial}{\partial p}\left(\frac{((f-r_1)\cdot(f-r_1))^{1/2}-((f-r_2)\cdot(f-r_2))^{1/2}}{((f-r_1)\cdot(f-r_1))^{1/2}+((f-r_2)\cdot(f-r_2))^{1/2}}\right) =$$

$$\frac{1}{(Q_2)^2}\left(\left(\frac{1}{2}(f\cdot f - 2f\cdot r_1 + r_1\cdot r_1)^{-1/2}\left(2\frac{\partial f}{\partial p}\cdot f - 2\frac{\partial f}{\partial p}\cdot r_1\right) - \right.\right.$$

$$\frac{1}{2}(f\cdot f - 2f\cdot r_2 + r_2\cdot r_2)^{-1/2}\left(2\frac{\partial f}{\partial p}\cdot f - 2\frac{\partial f}{\partial p}\cdot r_2\right)\right)Q_2 -$$

$$Q_1\left(\frac{1}{2}(f\cdot f - 2f\cdot r_1 + r_1\cdot r_1)^{-1/2}\left(2\frac{\partial f}{\partial p}\cdot f - 2\frac{\partial f}{\partial p}\cdot r_1\right) + \right.$$

$$\left.\left.\frac{1}{2}(f\cdot f - 2f\cdot r_2 + r_2\cdot r_2)^{-1/2}\left(2\frac{\partial f}{\partial p}\cdot f - 2\frac{\partial f}{\partial p}\cdot r_2\right)\right)\right)$$

where

[Math. 4]

$$Q_1 = ((f-r_1)\cdot(f-r_1))^{1/2} - ((f-r_2)\cdot(f-r_2))^{1/2} \quad \text{Equation (4)}$$

[Math. 5]

$$Q_2 = ((f-r_1)\cdot(f-r_1))^{1/2} + ((f-r_2)\cdot(f-r_2))^{1/2} \quad \text{Equation (5)}$$

[Math. 6]

$$\frac{\partial f}{\partial p} = \frac{\partial}{\partial p}(F(W(x;p))) = \quad \text{Equation (6)}$$

$$\frac{\partial}{\partial p}\left(F(W(x;p_0)) + \nabla F\frac{\partial W}{\partial p}\bigg|_{p=p_0}(p-p_0)\right) = \nabla F\frac{\partial W}{\partial p}$$

The above equations express $Q_1$, $Q_2$, and f partially differentiated by the model parameter p.

The search parameter update means 150 adds the parameter gradient direction Δp computed by the parameter gradient direction computation means 140 to the current search parameter p thereby to update the search parameter p (step S115). The search parameter p is updated in the following Equation.

[Math. 7]

$$p = p - c \times \Delta p \quad \text{Equation (7)}$$

where c is a constant for defining a magnitude of the gradient direction Δp added to the search parameter p.

The convergence determination means 160 determines whether the search parameter p updated by the search parameter update means 150 is convergent (step S116). When the parameter is not convergent (No in step S116), the facial feature point location estimation device 1 causes the nearest neighbor template computation means 130 to perform the processing in step S113 again. When the parameter is convergent (Yes in step S116), the facial feature point location estimation device 1 causes the search result output means 170 to perform the processing in step S117.

The convergence determination means 160 can determine whether the parameter is convergent depending on whether a change in the misclassification measure J in Equation (1) as a result of the repeatedly-applied processings performed from the nearest neighbor template computation means 130 to the search parameter update means 150 is smaller than a predetermined threshold, for example.

The convergence determination means 160 may determine whether the parameter is convergent depending on whether a change in facial feature point location computed by the nearest neighbor template computation means 130 is smaller than a predetermined threshold.

The search result output means 170 computes a facial feature point location on the basis of the optimized search parameter p. The search result output means 170 then outputs the computed facial feature point location as a search result (step S117). The facial feature point location search parameter p is on the principal component subspace of the coordinate values of the 75 facial feature points. Therefore, the facial feature point locations relative to the current facial feature point location search parameter p can be acquired by inverse projection from the subspace.

The feature point location estimation device according to the present exemplary embodiment can select a template capable of optimally discriminating a facial image acquired in a correct shape and a facial image acquired in a deviated shape from among the representative templates of facial images acquired in a correct shape and the representative templates of facial images acquired in a deviated shape, and can optimize the facial feature point search parameter by use of the selected template.

The feature point location estimation device according to the present exemplary embodiment can have a plurality of representative positive example templates and a plurality of representative negative example templates. Consequently, a complicated discriminated face is constructed in the two-class discriminator for facial images in a correct shape and facial images in a deviated shape, and thus model fitting is less likely to be in a local solution, thereby detecting a facial feature point location with high accuracy.

Figure 5:
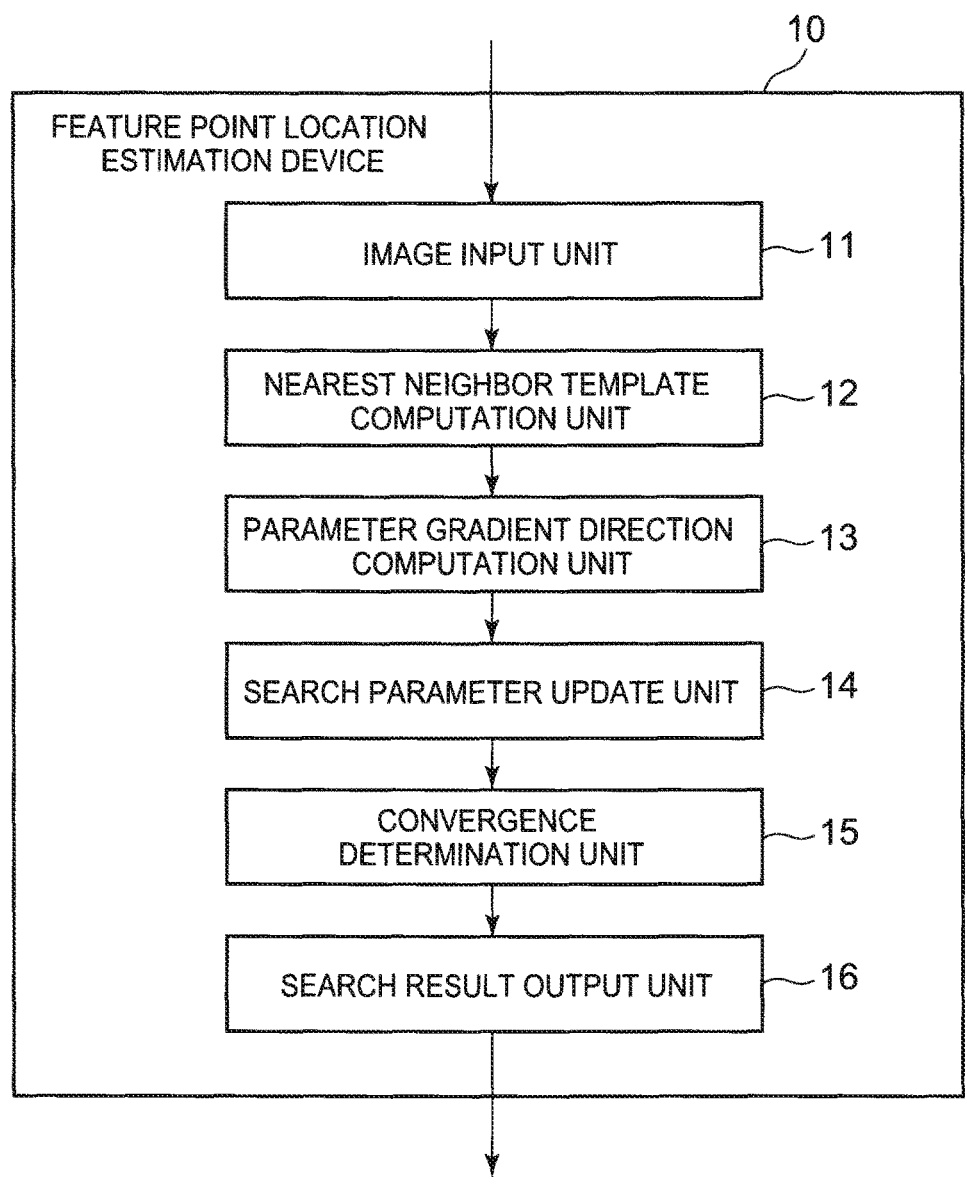
FIG. 5 It depicts a block diagram illustrating an outline of a feature point location estimation device according to the present invention.

An outline of the present invention will be described below. FIG. 5 is a block diagram illustrating an outline of a feature point location estimation device according to the present invention. The feature point location estimation device 10 according to the present invention includes an image input unit 11 (the image input means 110, for example) which receives input of a facial image from an external source, a nearest neighbor template computation unit 12 (the nearest neighbor template computation means 130, for example) which obtains a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples, a parameter gradient direction computation unit 13 (the parameter gradient direction computation means 140, for example) which computes, from the facial feature point location search parameter and the nearest neighbor templates, a gradient direction of the facial feature point location search parameter, a search parameter update unit 14 (the search parameter update means 150, for example) which updates the facial feature point location search parameter by adding the computed gradient direction, a convergence determination unit 15 (the convergence determination means 160, for example) which determines whether the updated facial feature point location search parameter is convergent, and a search result output unit 16 (the search result output means 170, for example) which, when the facial feature point location search parameter is determined as being convergent, outputs a facial feature point location computed by the facial feature point location search parameter as a search result.

With the structure, the feature point location estimation device can enable fitting of a model to be less prone to local solutions and detect a facial feature point with more practical precision.

The parameter gradient direction computation unit 13 may compute a gradient direction in an equation for computing a gradient of a facial feature point location search parameter derived by partially differentiating a predetermined evaluation function.

With the structure, the feature point location estimation device can compute a gradient direction in an equation for computing a gradient of a facial feature point location search parameter.

The predetermined evaluation function may be an evaluation function for a facial feature point location search parameter of misclassification measure.

With the structure, the feature point location estimation device can optimize a facial feature point search parameter by use of a misclassification measure in generalized learning vector quantization.

Further, the feature point location estimation device 10 may include a template storage unit (the template storage means 210, for example) which stores information on a plurality of facial image templates.

The feature point location estimation device 10 may include an initial location input unit which receives input of an initial location of a facial feature point from an external source, and the nearest neighbor template computation unit 12 may initialize the facial feature point location search parameter using the input initial location.

With the structure, the feature point location estimation device can initialize the facial feature point location search parameter by use of an externally-input initial location.

The present invention has been described above with reference to the exemplary embodiment and the examples, but the present invention is not limited to the exemplary embodiment and the examples. The structure and details of the present invention can be variously changed within the scope of the present invention understandable by those skilled in the art.

The present application claims the priority based on Japanese Patent Application No. 2013-176283 filed on Aug. 28, 2013, the disclosure of which is all incorporated herein by reference.

INDUSTRIAL APPLICABILITY

The facial feature point location estimation device, the facial feature point location estimation method, and the facial feature point location estimation program according to the present invention can be widely applied for higher accuracy in the processing of inputting a facial image for face detection, face authentication, facial expression recognition, and the like.

REFERENCE SIGNS LIST

1 Facial feature point location estimation device
10 Feature point location estimation device
11 Image input unit
12 Nearest neighbor template computation unit
13 Parameter gradient direction computation unit
14 Search parameter update unit
15 Convergence determination unit
16 Search result output unit
100 Data processing device
110 Image input means
120 Initial location input means
130 Nearest neighbor template computation means
140 Parameter gradient direction computation means
150 Search parameter update means
160 Convergence determination means
170 Search result output means
200 Storage device
210 Template storage means

What is claimed is:

1. A feature point location estimation device comprising:
an image input unit which receives input of a facial image from an external source;
a parameter gradient direction computation unit, implemented by a processor, which computes, from a plurality of facial image templates constituted by positive examples and negative examples and a facial feature point location search parameter, a gradient direction of the facial feature point location search parameter;
a search parameter update unit, implemented by the processor, which updates the facial feature point location search parameter by adding the computed gradient direction to the facial feature point location search parameter;
a convergence determination unit, implemented by the processor, which determines whether the updated facial feature point location search parameter is convergent; and
a search result output unit, implemented by the processor, which, when the updated facial feature point location search parameter is determined as being convergent, outputs a facial feature point location computed by the facial feature point location search parameter as a search result,
wherein the parameter gradient direction computation unit obtains a nearest neighbor template from among positive examples and a nearest neighbor template from among negative examples, said nearest neighbor templates being the templates nearest to an image that is computed from the inputted facial image using the facial feature point location search parameter from among the facial image templates constituted by the positive examples and the negative examples, and computes a gradient direction of the facial feature point location search parameter on a basis of the facial feature point location search parameter and the nearest neighbor templates.

2. The feature point location estimation device according to claim 1,
wherein the parameter gradient direction computation unit computes the gradient direction in an equation for computing a gradient of the facial feature point location search parameter derived by partially differentiating a predetermined evaluation function.

3. The feature point location estimation device according to claim 2,
wherein the predetermined evaluation function is an evaluation function for a facial feature point location search parameter of misclassification measure.

4. The feature point location estimation device according to claim 1, comprising:
a template storage unit, implemented by a semiconductor memory, which stores information on a plurality of facial image templates.

5. The feature point location estimation device according to claim 1, comprising:
an initial location input unit, implemented by the processor, which receives input of an initial location of a facial feature point from an external source,
wherein the parameter gradient direction computation unit initializes a facial feature point location search parameter using the input initial location.

6. A feature point location estimation method comprising the steps of:
- receiving input of a facial image from an external source;
- obtaining a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples;
- computing a gradient direction of the facial feature point location search parameter on a basis of the facial feature point location search parameter and the nearest neighbor templates;
- updating the facial feature point location search parameter by adding the computed gradient direction to the facial feature point location search parameter;
- determining whether the updated facial feature point location search parameter is convergent; and
- when the updated facial feature point location search parameter is determined as being convergent, outputting a facial feature point location computed by the facial feature point location search parameter as a search result.

7. The feature point location estimation method according to claim 6, comprising the step of:
- computing the gradient direction in an equation for computing a gradient of the facial feature point location search parameter derived by partially differentiating a predetermined evaluation function.

8. A non-transitory computer-readable recording medium having recorded therein a feature point location estimation program for causing a computer to perform:
- an input processing of receiving input of a facial image from an external source;
- a computation processing of obtaining a nearest neighbor template from among positive examples and a nearest neighbor template from among negative examples, said nearest neighbor templates being the templates nearest to an image that is computed from the inputted facial image using a facial feature point location search parameter from among a plurality of facial image templates constituted by the positive examples and the negative examples, and computing a gradient direction of the facial feature point location search parameter on a basis of the facial feature point location search parameter and the nearest neighbor templates;
- an update processing of updating the facial feature point location search parameter by adding the computed gradient direction to the facial feature point location search parameter;
- a determination processing of determining whether the updated facial feature point location search parameter is convergent; and
- an output processing of, when the updated facial feature point location search parameter is determined as being convergent, outputting a facial feature point location computed by the facial feature point location search parameter as a search result.

9. The non-transitory computer-readable recording medium having recorded therein a feature point location estimation program, according to claim 8, the feature point location estimation program for causing a computer to perform:
- a computation processing of computing the gradient direction in an equation for computing a gradient of the facial feature point location search parameter derived by partially differentiating a predetermined evaluation function.

* * * * *